(12) United States Patent
Spencer et al.

(10) Patent No.: US 7,621,560 B2
(45) Date of Patent: Nov. 24, 2009

(54) HORN SWITCH

(75) Inventors: Byron Spencer, Bloomfield, MI (US);
Xiaoping Xu, Rochester Hills, MI (US);
Leslie A. Wade, Dearborn, MI (US);
Andrew P. Katsock, Sterling Heights, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 440 days.

(21) Appl. No.: 11/347,078

(22) Filed: Feb. 3, 2006

(65) Prior Publication Data

US 2006/0175816 A1 Aug. 10, 2006

Related U.S. Application Data

(60) Provisional application No. 60/650,770, filed on Feb. 7, 2005.

(51) Int. Cl.
*B60R 21/203* (2006.01)
(52) U.S. Cl. .................... 280/731; 200/61.54
(58) Field of Classification Search ............. 280/728.2, 280/731; 200/61.54, 61.55
See application file for complete search history.

(56) References Cited

U.S. PATENT DOCUMENTS 4,808,776 A    2/1989  Niwa et al.
5,303,952 A *  4/1994  Shermetaro et al. .......... 280/731
5,327,796 A *  7/1994  Ernst et al. .................. 280/731
5,410,114 A *  4/1995  Furuie et al. ............. 200/61.55
5,459,294 A * 10/1995  Danielson ................. 200/61.54
5,593,178 A *  1/1997  Shiga et al. .................. 280/731
6,600,114 B2   7/2003  Kikuta et al.
6,860,509 B2 * 3/2005  Xu et al. ..................... 280/731
2005/0161308 A1 7/2005 Frisch

FOREIGN PATENT DOCUMENTS

JP    63-133411 A    6/1988
JP    63-181216 A    2/1989
JP    05-62380  U    8/1993
JP    3028941   U    7/1996

\* cited by examiner

*Primary Examiner*—Paul N Dickson
*Assistant Examiner*—Robert A Coker
(74) *Attorney, Agent, or Firm*—Markell Seitzman

(57) ABSTRACT

An assembly is provided for steering a vehicle including a steering wheel (18) with an armature (300); an air bag module (14) is coupled to the steering wheel and is operable to expand to absorb the kinetic energy of the driver. A horn switch (16) is coupled to the steering wheel and the air bag module. The horn switch is operable to generate an electrical signal based on an input from the driver. The horn switch includes a pair of electrically conductive elements (40, 42) operable to generate the signal.

29 Claims, 13 Drawing Sheets

301

HORN SWITCH

This application claims the benefit of U.S. Provisional Application 60/650,770, filed on Feb. 7, 2005. The disclosure of the above application is incorporated herein by reference.

SUMMARY AND BACKGROUND OF THE INVENTION

The present invention relates to motor vehicle systems and more particularly to a horn switch.

Generally, motor vehicles are equipped with horns, which enable the emission of an audible signal to alert passersby of the presence of the automobile. The horn is typically activated by a switch. Generally, the switch is comprised of two electrical contacts, one of which is disposed on the air bag module, and the other on an armature of a steering wheel.

The present invention provides a horn switch that is coupled between a stationary member such as a steering wheel and a movable member such as an air bag module. The horn switch is operable to generate an electrical signal based on an input from the driver. The horn switch includes a plurality of electrically conductive elements such as wires or stampings, which are configured to be moved into contact with each other to generate the signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

Figure 1:
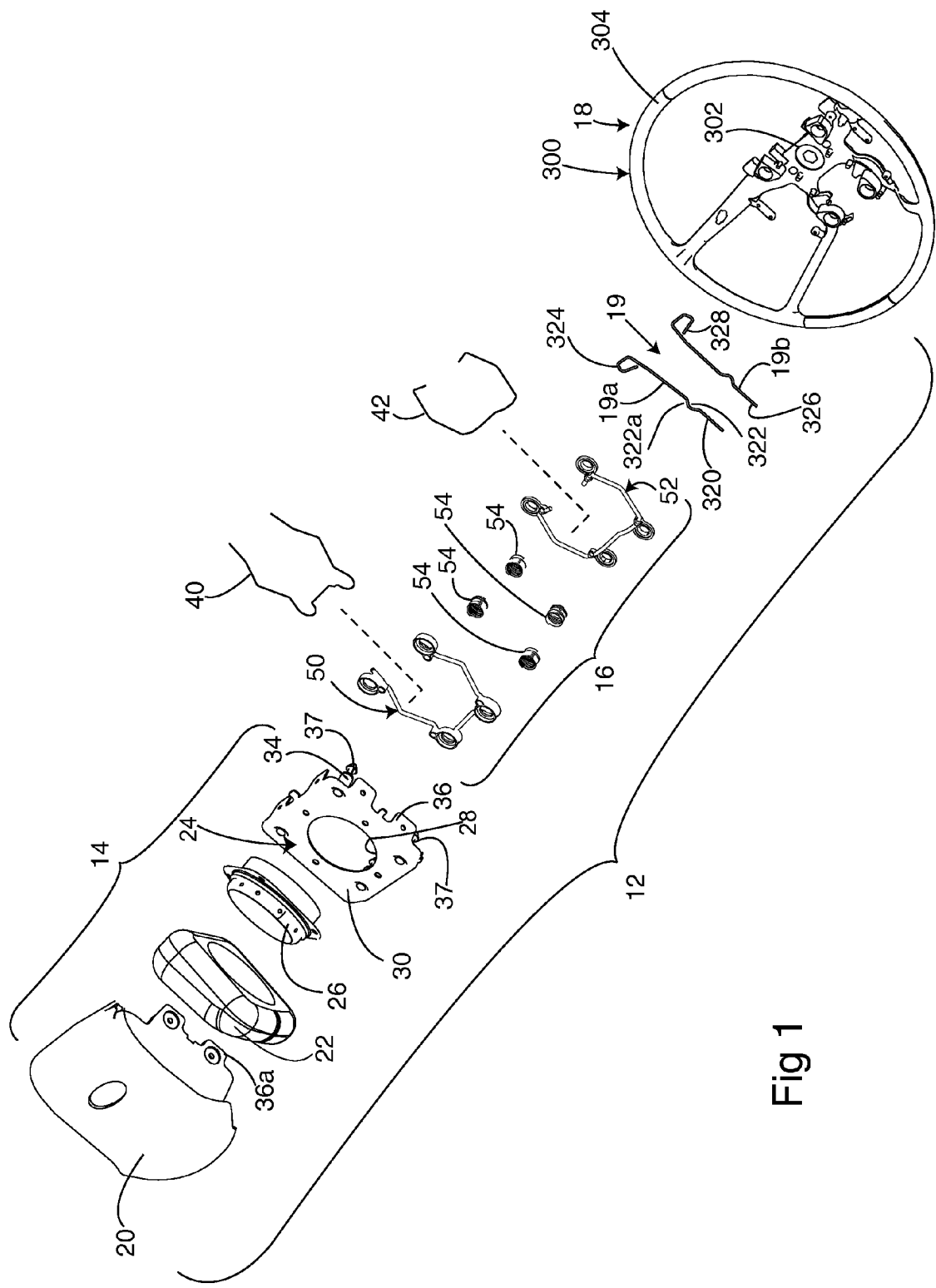
FIG. 1 is a perspective view of a steering wheel employing a horn switch according to the principles of the present invention.

The following description of various embodiments is merely exemplary in nature and is in no way intended to limit the invention, its application, or uses. Although the following description is related generally to a horn switch for use in a motor vehicle, it will be understood that this switch could be utilized with any appropriate application. Therefore, it will be understood that the following discussions are not intended to limit the scope of the appended claims.

With reference now to FIGS. 1 through 6, a steering wheel assembly 12 is shown for use with a motor vehicle. The steering wheel assembly 12 includes an air bag module 14, a horn switch 16 and steering wheel 18. The steering wheel, which in general functions as a driver interface, comprises a metal armature 300 and a number of other parts 301, which are not pertinent to the present invention and which are diagrammatically illustrated in FIG. 1a. These other parts may include: the foam and/or resin molded about the metal armature, the back cover often connected to the armature, leather covering and switches. The horn switch 16 is disposed between a movable member such as the air bag module 14 and a stationary member such as the wheel 18. The air bag module is secured to the steering wheel armature 18a by a spring clip assembly 19. As can be appreciated, the horn switch 16 can be located between any two cooperating members configured to squeeze the elements of the horn switch 16 together. Further, it is also within the invention to construct a horn switch 16 by separating the upper and lower horn switch housings 50 and 52 and connecting the upper horn switch housing 50 to the plate 24 (or a pushing member) and connecting the lower horn switch housing 52 to the armature 300 (or fixed member), see FIG. 10. Upon introduction of the spring 54 and upon assembly of the air bag module 14 to the steering wheel 18, the horn switch 16 will be assembled and have the above configuration.

Figure 2A:
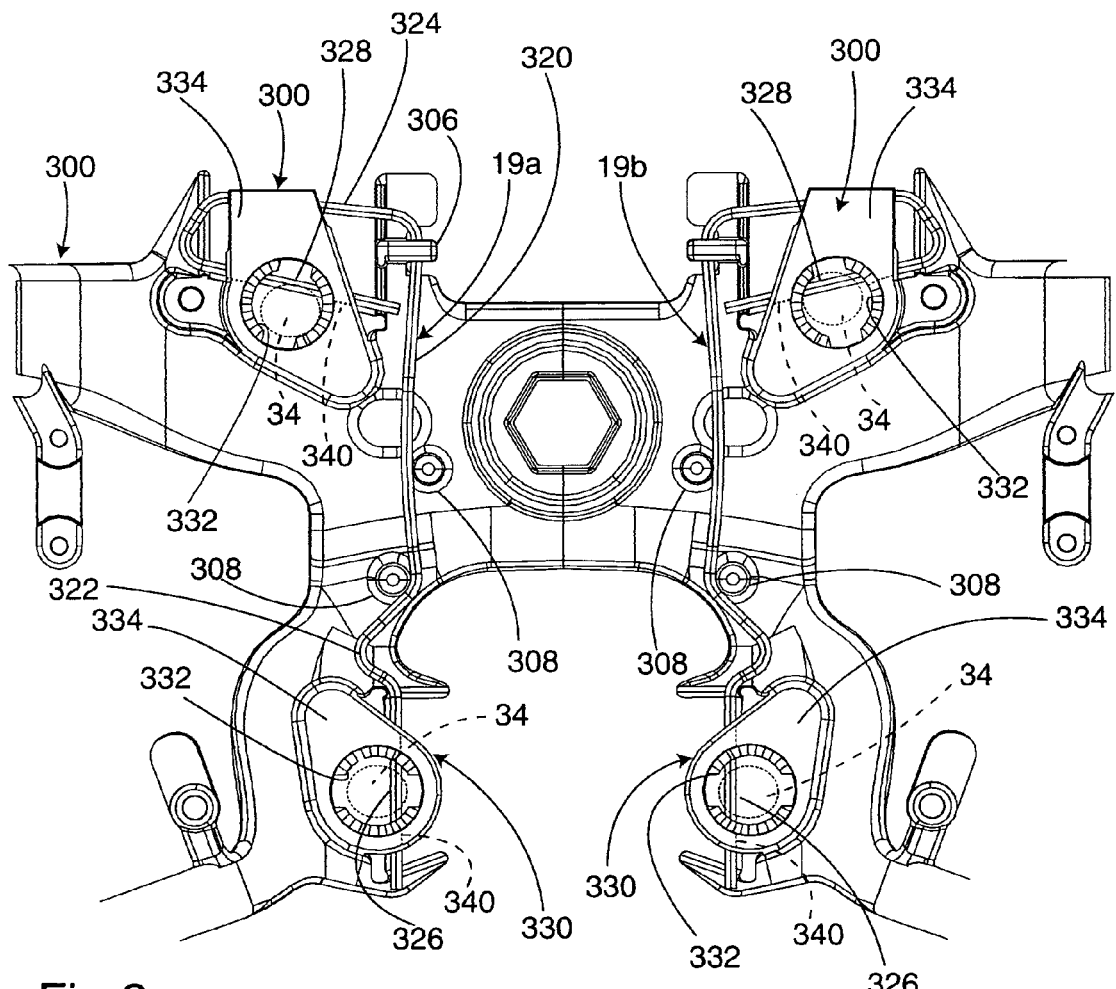
FIG. 2a is an enlarged view of the armature also showing spring clips secured to the armature.
Figure 2C:
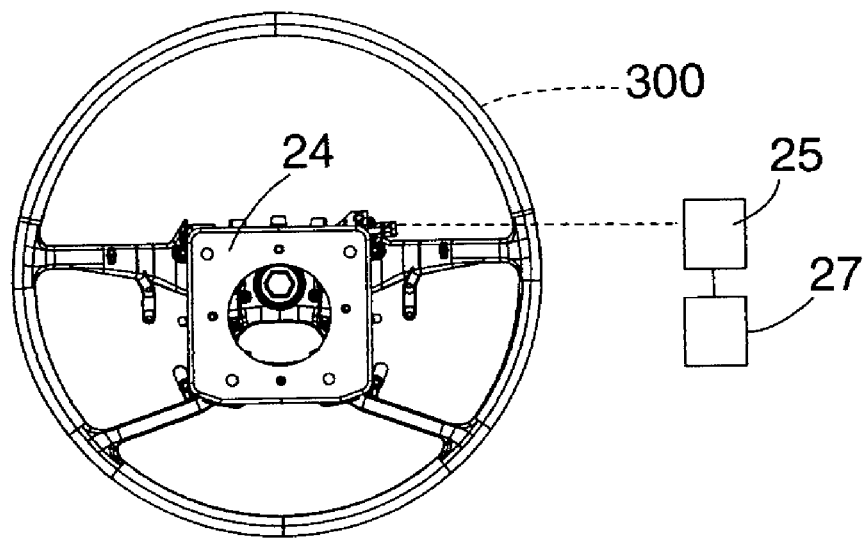
FIG. 2c is a plan view showing the mounting plate secured to the steering wheel armature.
Figure 2:
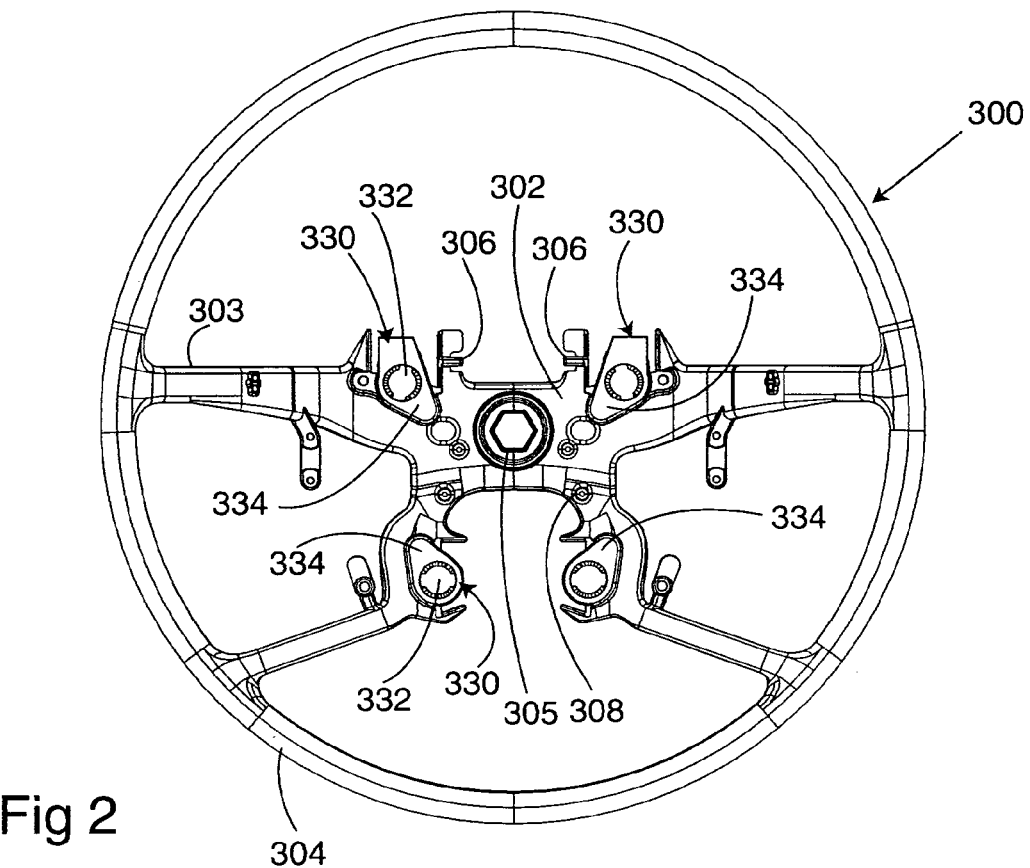
FIG. 2 is a perspective view of a steering armature for use with the horn switch of FIG. 1.
Figure 2B:
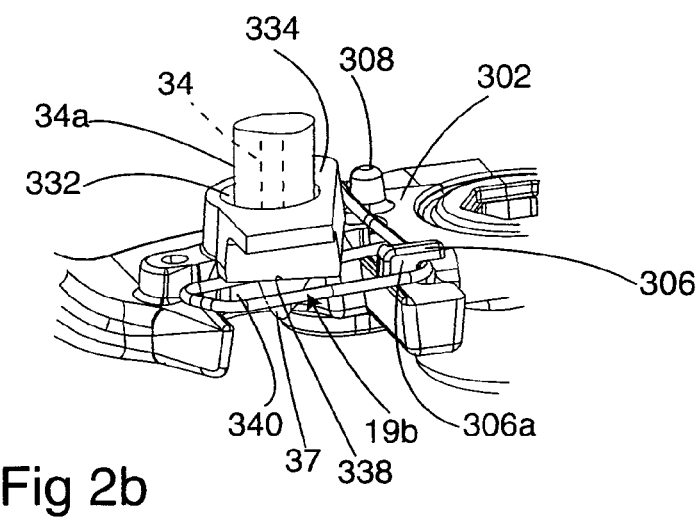
FIG. 2b is another enlarged view of a portion of the armature showing a portion of one of the spring clips.

Reference is briefly made to FIGS. 2, 2a and 2b, which show various features of the steering wheel armature 300 and spring clip mechanism 19. The steering wheel armature 300 generally comprises a metallic material (often cast magnesium, aluminum or steel). The armature 300 includes a hub region (referred to as a hub) 302, a plurality of spokes 303, which connect the hub 302 to a rim 304. The hub region includes a number of hooks 306 and pins 308, each preferably being integrally formed as part of the hub region. The hub region, or control member, includes a connection 305 connectable to the steering shaft of the vehicle. These connection features, such as the hooks and pins, secure each spring clip 19a, 19b of the spring clip assembly 19 to the armature 300.

Figure 1A:
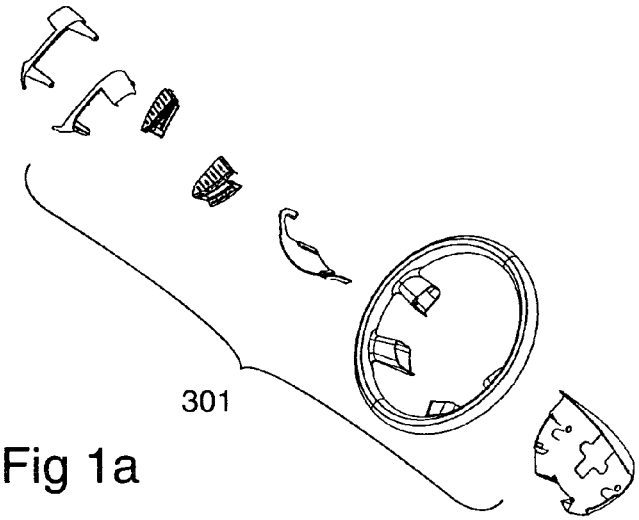
FIG. 1a shows a number of ancillary elements of a steering wheel.
Figure 1B:
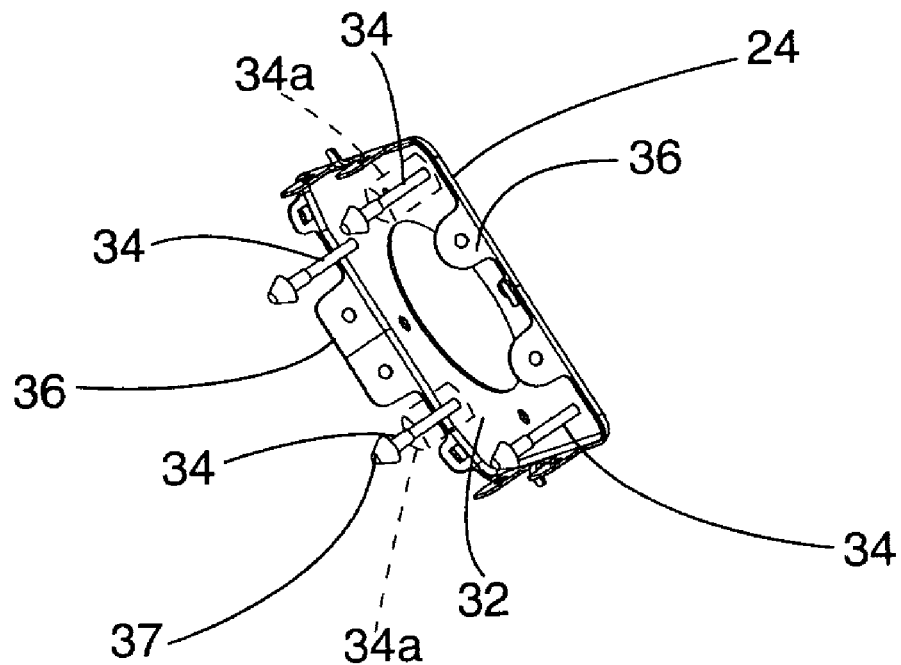
FIG. 1b shows a mounting plate which could be part of an air bag module.

As shown in FIGS. 1 and 2a, each spring clip 19a or 19b comprises a resilient material including a polymer or metal that may be preformed into a desire shape. Each spring clip has a shaft 320 having a medial bend 322 therein and an optional looped section 324 at one end. The medial bend 322 includes a ramped surface 322a, which facilitates removal of the spring clip from the armature. Each spring clip includes ends 326 and 328, which as illustrated are generally straight in shape and which function to secure the end of each pin 34 of the air bag module 14 to the armature shown in FIG. 1b. Each spring clip is secured to the armature 300 by bending the spring clip about a hook 306 and two pins 308 to achieve the configuration shown in FIG. 2a. The spring clips 19a, 19b can be removed by reversing the above process or by pulling the looped section 324 toward the top of the armature 300. As the spring clip is moved, the medial bend 322 slides around the adjacent pin 308, which causes end 326 to disengage a lower pin 34. The spring clip is pulled out of the armature to disengage from each pin 34. In this configuration the spring clip is stressed and presses against a corresponding wall of the hook 306 and pins 308. As can be appreciated, the vertically extending portion 306a, see FIG. 2b, of hook 306 operates as a pin, the horizontal portion of which limits the upward displacement of the looped end 324 from the hub 302.

Reference is again made to FIG. 1b. Each of the pins 34 may be surrounded by a plastic body or bobbin 34a, which effectively increases the diameter of the body of the pin 34. As seen below the wider part 34a is received within openings in upper and lower horn switch housings 50 and 52 (the plastic body is only shown about some of the pins 34 in FIG. 1b).

The armature 300 includes a number of support members 330, which function to support the horn switch 16 and which guide the air bag module 14 into its mounted location upon the armature. As illustrated, four support members 330 are used in the illustrated embodiment. The location of the support members 330 is determined in part by the dimensions and construction of the air bag module. Each support member includes a passage, bore or opening 332 to receive a pin 34 (shown in phantom line in FIG. 2a) of the air bag module 14, each such pin 34 engaging an end 326 or 328 of the spring clip 19a or 19b. Each support member 330 includes a top or anvil surface 334, which supports and reacts against a lower horn switch housing 52, and a lower surface 338 (see FIG. 2b) which is elevated above the hub 302 and which defines a space or groove 340 into which the end of the spring clip is received. As can be appreciated from FIG. 2b, a tip of a tool 339, such as a screw driver, may be inserted into the looped end 324 of each clip 19a, 19b to apply pressure to the looped end 324 to urge or slide the clip out of the armature.

The air bag module 14 includes a cover 20, which is operable to protect an air bag 22. The cover 20 is illustrated as rectangular; however, any desired shape could be employed. Generally, the cover 20 is made from a polymeric material, such as polyester (TPE), but any other suitable material could be used. The cover 20 may be coupled, in a known manner, to a mounting plate 24 to define a cavity for the receipt of the air bag 22 and an inflator 26. The inflator 26 is operable to fire the air bag 22 upon the determination of a crash event.

As can be appreciated, the armature 300 can be replaced by another stationary member. Similarly, the air bag module 14 or plate 24 can be replaced by another movable member. Further, if the plate did not use pins 34 to locate the module upon the air bag, the armature 300 need not include the through holes 332.

The plate 24 may include a central aperture 28 to receive and support a portion of the inflator 26, a first or top side 30, and a second or lower side 32. The first side 30 is generally configured to provide an interface for the air bag 22 and inflator 26. The second or lower side 32 of the plate 24 generally includes a plurality of prongs or pins 34 and a plurality of flanges 36 to couple the plate 24 to a similar element 36a on the cover 20. In this embodiment, the second side 32 of the plate 24 includes four pins 34, which include at least one attachment mechanism 37, such as conically shaped tip, clip, hook or flange, which are each operable to couple the air bag module 14 and the horn switch 16 to the armature 300, as will be described in greater detail below.

Figure 3:
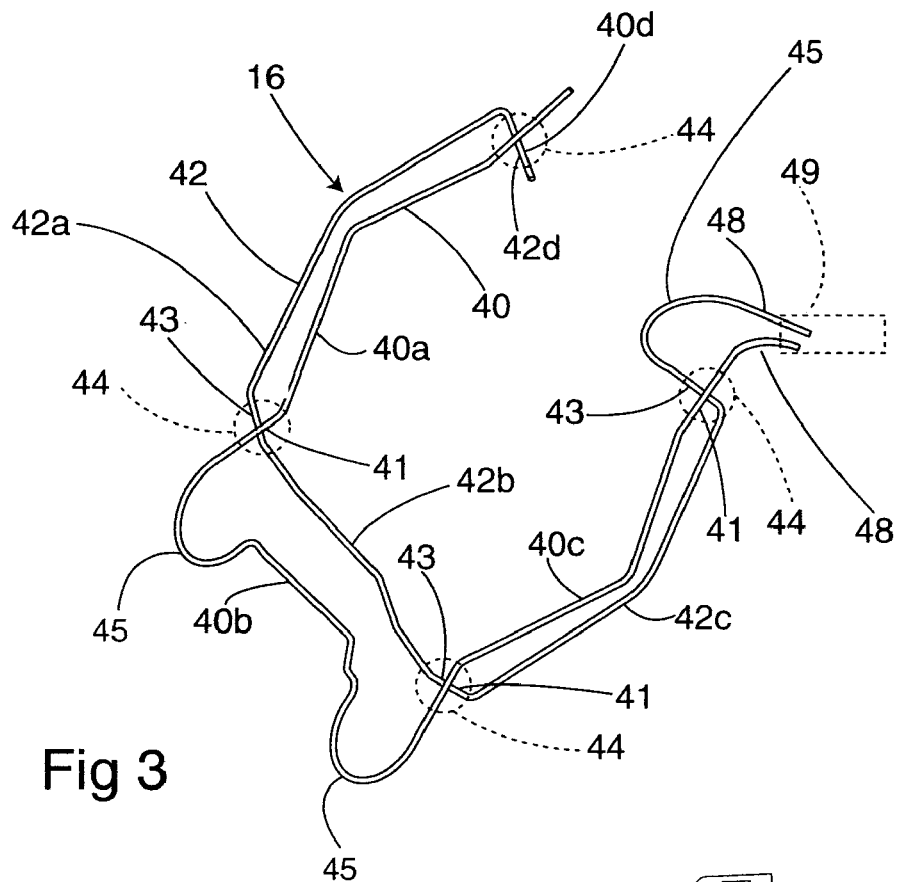
FIG. 3 shows a plurality of conductive elements, which form electrical contacts of a horn switch.
Figure 3C:
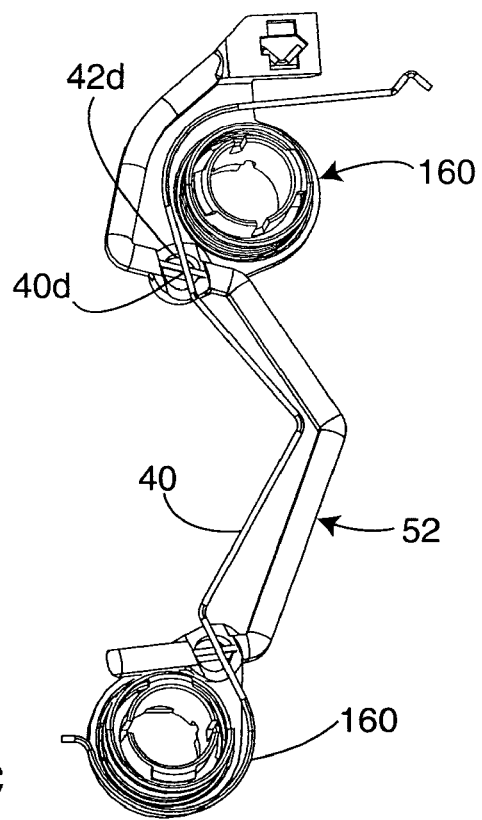
FIG. 3c is a partial view of the horn switch and illustrates the crisscrossing of the conductive elements of the horn switch.
Figure 3A:
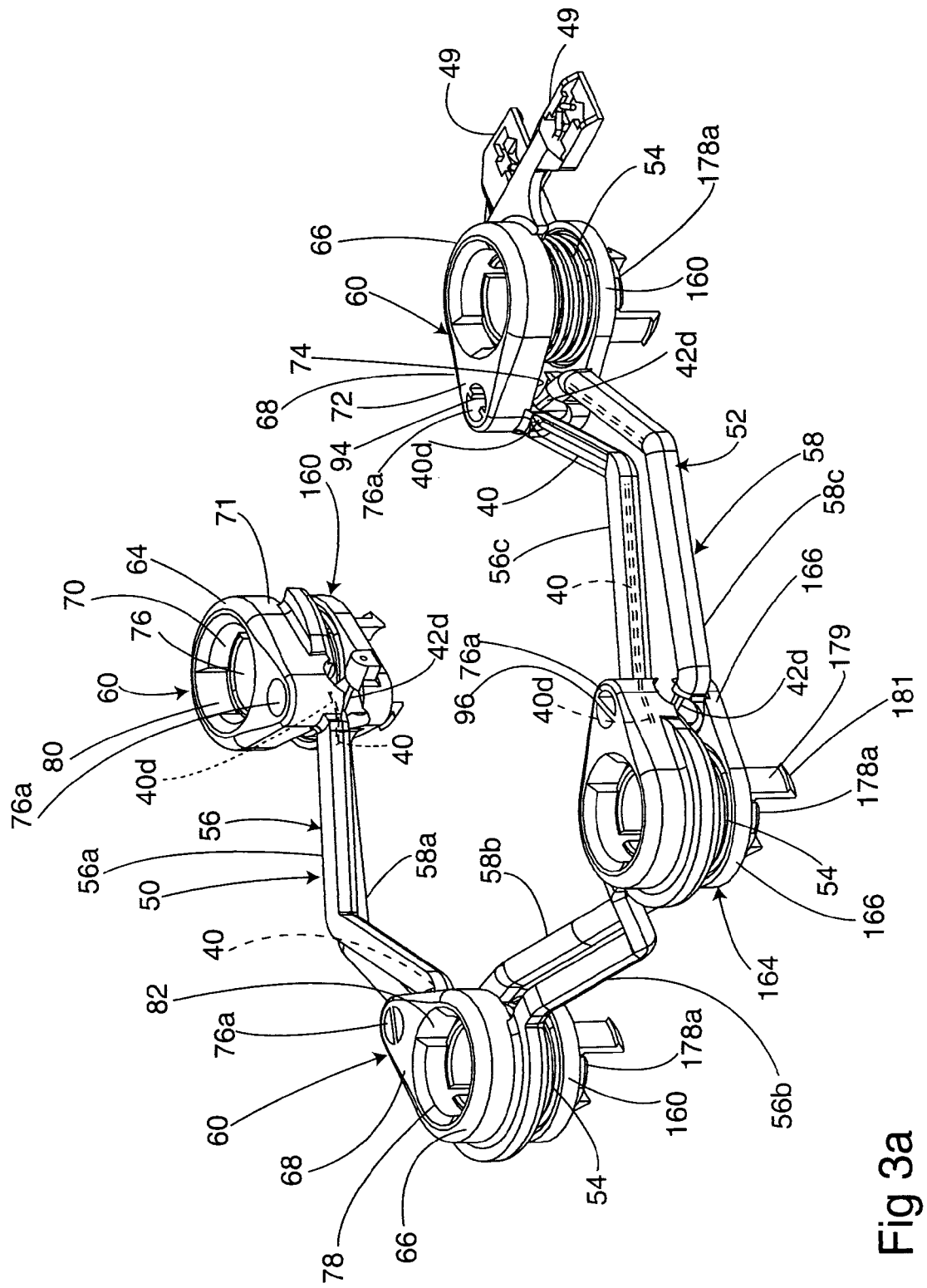
FIG. 3a is an isometric view of a horn switch.
Figure 3B:
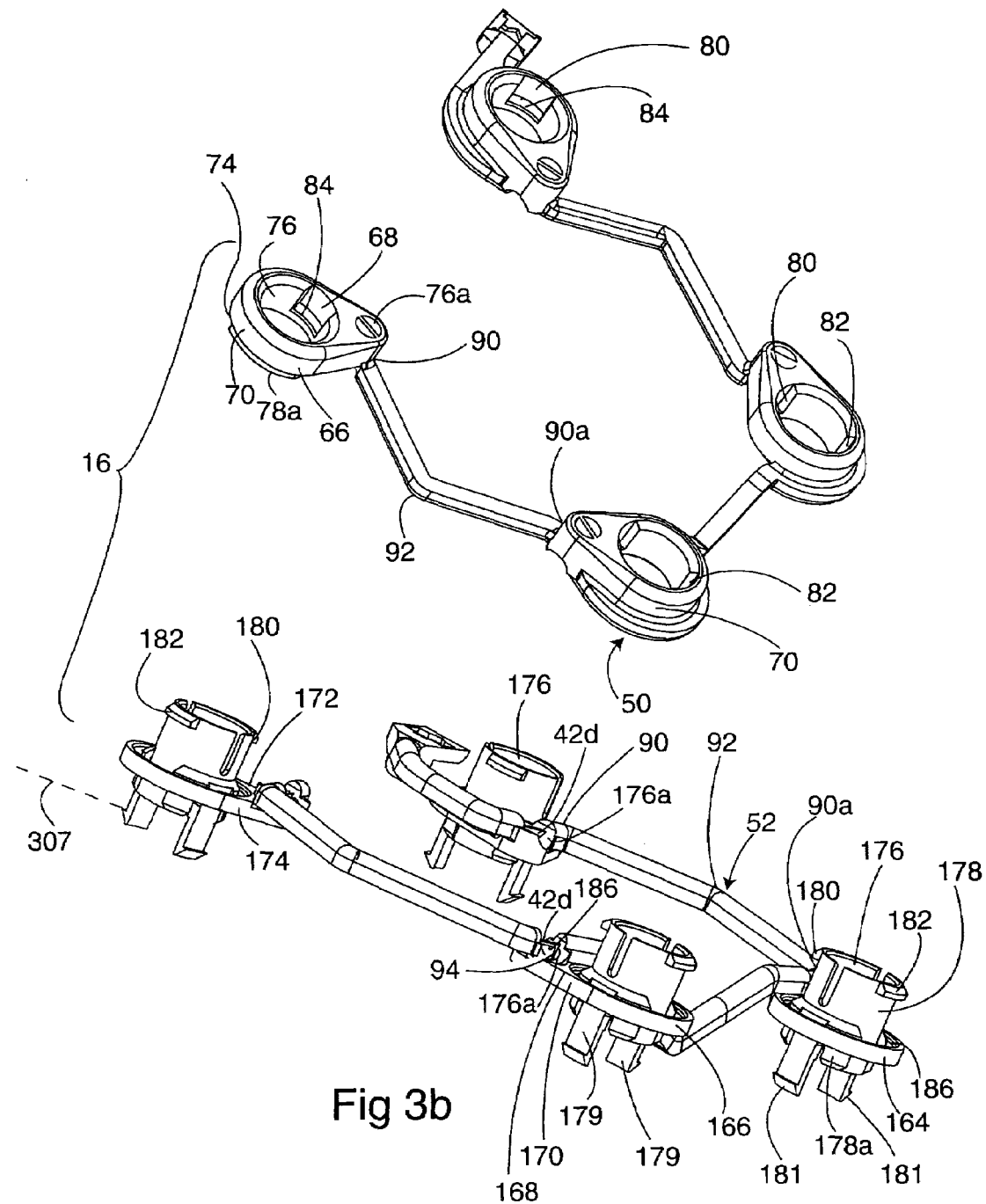
FIG. 3b is an exploded view of a horn switch.

The horn switch 16 in general, as shown in FIGS. 3, 3a and 3b, comprises two relatively movable electrical conductors formed, for example, as electrical wires, an upper wire 40 and a lower wire 42. The wires 40 and 42 are configured so that when in engagement and closing the electric circuit for the horn 27, they are capable of crossing or contacting in a plurality of locations, each such as location 44 (shown within dotted circles in FIG. 3) forming electrical contacts or contact points. When the two wires are used in a horn switch, three or four crossing or contact points appears to be adequate to accommodate the normal usage in which the driver may push upon the air bag cover at one of many different points, each of which must cause at least one contact to be closed. As can be appreciated, the driver of the vehicle might press upon the center of the cover 20 or at its top, bottom, sides, etc. Respective ends 48 of each wire are adapted to be connected to one or more electrical connector(s) 49 to provide communication with an electrical control unit 25, which communicates the horn activation signal, produced upon contact of the wires, to a horn 27 (see FIG. 2c). As illustrated in FIG. 3, the ends 48 are configured to be closely spaced, so that one electrical connector can be used. Two such connectors are shown in FIG. 3a. As previously mentioned, the electrical conductors 40 and 42 need not be extruded wires. The electrical conductors can be formed by stamping, casting or even molding.

The horn switch 16 includes a first or upper housing 50 and a second or lower housing 52. Each housing 50 and 52 is relatively movable and they are biased apart by one or more springs such as a plurality of helical springs 54. Each housing 50 and 52 protectively and insulatively encloses a respective one of the wires (conductors) 40 and 42. Each housing 50 and 52 also supports exposed portions 40d, 42d of each wire, which function as an electrical contact. The spring support permits the two housings to move together so that all of the electrical contacts close relatively simultaneously (during for example, parallel movement of the horn switch housings). The springs also permit a relative rotation of the horn switch housings 50, 52, which occurs when the air bag cover is pushed at an off-center location, in which case one or more of the contacts will close. The relative rotation of the horn switch housings will cause the exposed wires 40d and 42d to contact at slightly different locations and also create a wiping action to keep the wires 48 free of debris or other particles that may enter the horn switch 16.

Each wire (conductor, conductive element) 40 and 42 has a plurality of legs including legs 40a, 40b, 40c and 42a, 42b and 42c. Wire 42 can be viewed as generally C-shaped, while wire 40 can be viewed as generally U-shaped. This configuration provides for the four contact points or regions 44. Wires of differing shape are within the scope of the present invention and each such shape will vary with the desired number of contacts, the relative placement of the contacts and the available space for the switch. Each of the upper and lower switch housings 50 and 52 is insert molded about the conductive elements or wires 40 and 42, and includes a respective insulative sheathing 56, with corresponding insulative sections or legs 56a-c molded about the legs 40a-c and sections 58a-c molded about legs 42a-c of the wires 40 and 42. Each of the upper and lower switch housings 50 and 52 further includes a plurality of support members 60 and 160 respectively, which support both the insulated and uninsulated portions of each wire. As can be appreciated, the support members and insulative sheaths are formed during the molding operation. In the illustrated embodiments, the support members 60 and 160 have a central opening to permit passage of the pins 34 of the air bag module. If the air bag module does not include such pins, a through passage is not needed. As can be appreciated, the pins 34, which pass through the horn switch and portions of the armature, effectively locate the horn housings 50 and 52 as well as the air bag module 14 relative to the steering wheel armature 300. Each of the conductive elements 40 and 42 includes curved portions 45, which are molded into the respective support members 60 and 160. The curved construction is used to accommodate the need for a through passage in the support members 60 and 160 and can be eliminated as needed.

Figure 4:
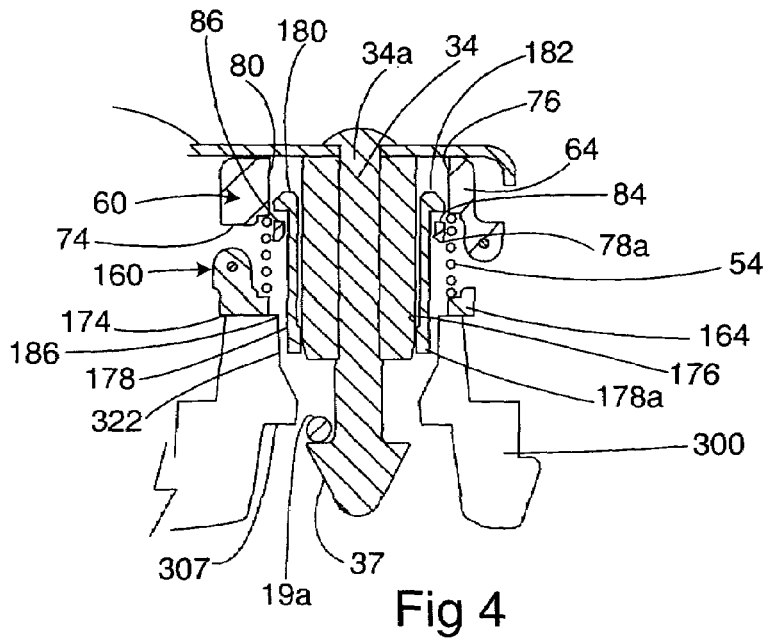
FIG. 4 is a cross-sectional view of a portion of the horn switch through section 4-4 of FIG. 6.
Figure 4A:
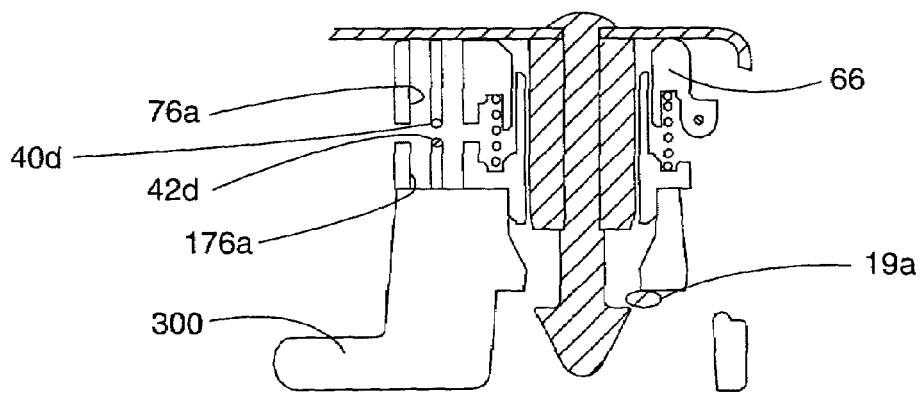
FIG. 4a is a cross-sectional view of a portion of the horn switch through section 4a-4a of FIG. 6.
Figure 4B:
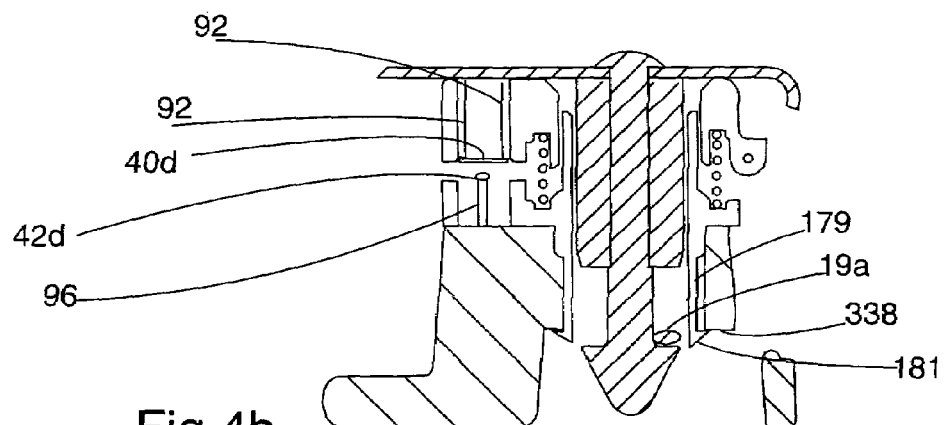
FIG. 4b is a cross-sectional view of a portion of the horn switch through section 4b-4b of FIG. 6.

Each of the upper support members 60, as shown in FIGS. 3a, 3b, and 4a, comprises a body 64, which as illustrated has an oval shape or egg shape, having a wide 66 and tapered 68 portion, which support both the insulated and the uninsulated portions 40d of wire 40 (see FIG. 3). Each body 64 has an exterior or outer wall 70, a top surface 72 and lower surface 74. An opening or passage 76 extends through the wide portion 66 of the body 64. A narrow opening 76a extends through the tapered portion of the body. The opening 76 is formed as an integrally formed first cylinder or cylindrical member 78, which is hollow and preferably extends below the lower surface 74; however, this is not a requirement of the invention. The extending portion of cylinder 78 is shown as 78a. The interior wall of the body forming the opening includes two opposing grooves 80 and 82, each of which terminates in a horizontal end or ledge 84. These grooves are beneficial as an assembly feature and are optional to the invention and are useful in limiting the outward movement of the spring housing 50 and 52, as this motion limit function can be provided on other parts of the systems adjacent to the horn switch.

Each lower support member 160 comprises a body 164, which as illustrated has an oval shape or egg shape, that is a wide 166 and tapered 168 portion, which supports both the insulated and the uninsulated portions of wire 42 (see FIG. 3). Each body 164 has an exterior or outer wall 170, a top surface 172 and lower surface 174. An opening or passage 176 extends through the wide portion 166 of the body 164. A narrow opening 176a extends through the tapered portion of the body. The opening 176 is formed as an integrally formed second cylinder or cylindrical member 178, which is hollow and preferably extends below the lower surface 174; however, this is not a requirement of the invention. The lower extending cylindrical part 178a (shown in FIG. 3a) is received within a corresponding opening 322 in armature 300.

The uninsulated, exposed portion of wire (conductive portion) 40d (or 42d), which traverses opening 76a of each support member 60 (or 176a) can span the sides of this opening without being supported. This may be the case where the conductive members 40, 42 are relatively rigid and do not deform much when in contact. To illustrate the above, some of the openings 76a of support member 60 are shown as simple cylindrical openings. Support member 160 and in particular opening 176a can be constructed the same way. In some situations it is desirable to support the conductive portions 40d and 42d, for example if the conductive members 40 and/or 42 are made of a soft material such as copper. FIGS. 3a, 3b, 4a and 4b illustrate ways of supporting the uninsulated, conductive portions 40d and/or 42d. In these figures some of the openings 76a (and 176a) include a bridge structure including two facing posts 94 (of insulative material) which extend down sides of opening 76 to support the conductive portion 40d (or 42d). These exposed conductive portions can also be supported by another bridge structure, which is fabricated as a wall 96 (of insulative material) spanning the opening 76a (or 176a). The extreme edge (the upper edge or lower edge as the case may be) of the wall 96 (see FIG. 4b) supports the conductive portion, for example wire segment 42d (or 40d as in the case for opening 76a).

The cylinder forming the opening 176 includes two opposing, radially extending flanges 180 and 182, which are slidingly received into one of the grooves 80 or 82 and when moved apart (by the springs 54) engage one of the ledges 84 to limit or stop the separation of each upper and lower support member of the upper and lower switch housings. If grooves 80 and 82 are not utilized, then the flanges 180 and 182 can be eliminated as well. The lower cylindrical part 178a can optionally be formed with one or more extensions 179 (see FIGS. 3a and 3b), which terminate in a hook-like formation 181. When the lower switch housing 52 is seated upon the armature 300, each of the hook-like formations 181 extends to the lower surface 338 of the armature 300 to secure the switch 16 in place, which is diagrammatically shown in FIG. 4b.

As can be appreciated, these extensions 179 and formations 181 are optional. However, they provide a benefit in shipping and installation. For example, if the horn switch and armature are assembled at a facility remote from the final module assembly location, the horn switch 16 can be installed and shipped as part of a partially assembled armature subassembly. And as can be appreciated, the extensions 179 and hook-like formations 181 provide a means for speeding assembly of the horn switch to a cooperating part such as the armature 300. The member that presses upon the horn switch 16, which in this case is the mounting plate 24 of the module 20, can be installed later. As mentioned, the horn switch of the present invention can be used with any two relatively movable parts, and the use of the switch is not limited to steering wheel armatures and air bag modules.

Figure 5:
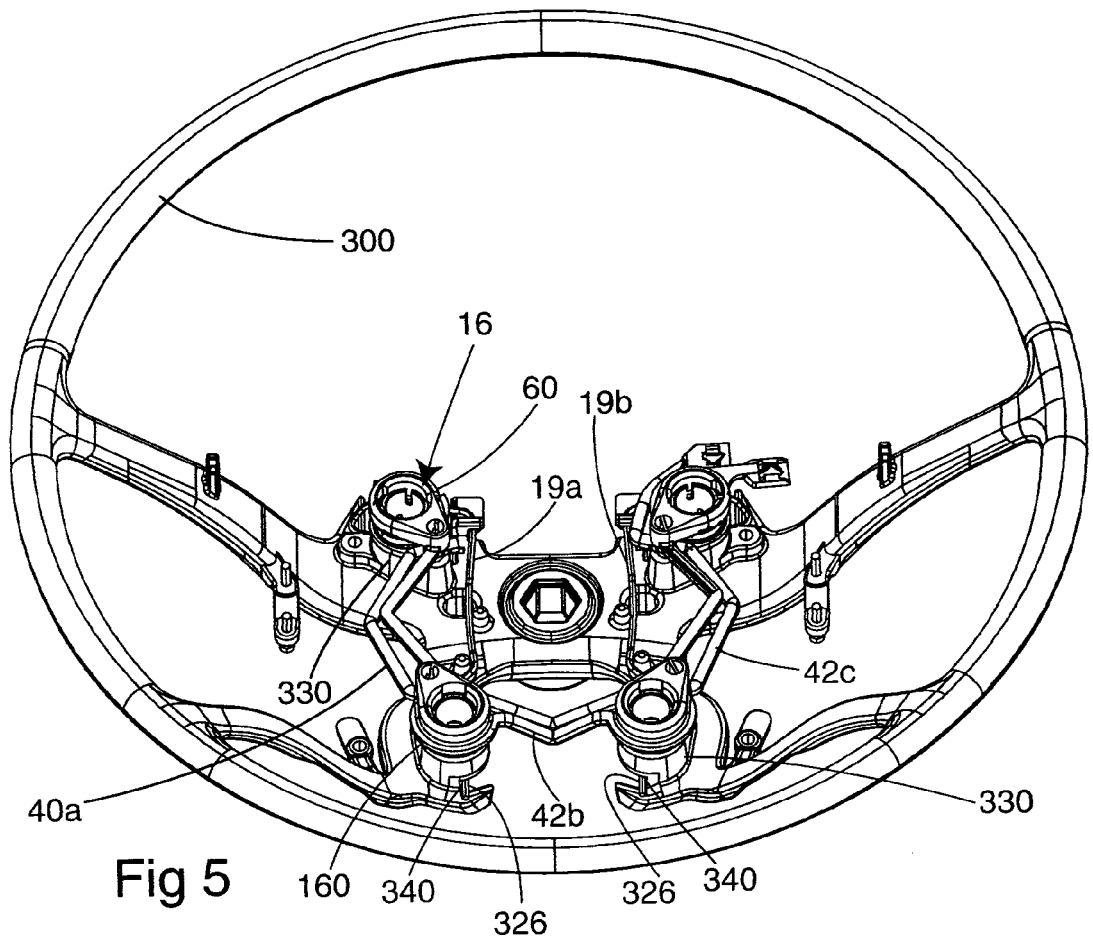
FIG. 5 is an isometric view showing the horn switch mounted to the armature.

Upon assembly of the horn switch, cylinder 178 is received in cylinder 78 and the flanges 180 and 182 are seated in grooves 80 and 82. Each of the cylinders 78 and 178 forms a respective, opposing annular space 86 and 186 in the upper and lower support members for reception of a spring 54. Reference is briefly made to FIG. 5, which shows the horn switch 16 mounted to the armature 300.

As previously mentioned, a plastic sheathing 56a-c of the upper switch housing 58a-c and of the lower switch housing respectively cover the wire legs 40a-c and 42a-c. Further, in the illustrated embodiment, each of the legs 40a-c and 42a-c is bent or curved with an apex at the center of each leg. As illustrated, each of the legs or segments 40a-c comprises two linear sections, which intersect at an angle or apex. Legs or segments 40a and c and 42a and c are bowed outwardly and extend generally horizontally while segments 40b and 42b are bowed, vertically downward. The bowing or curvature of the legs can be in any direction as space may permit. A similar configuration can be achieved if the wire segments are arcuately shaped. As can be seen, the linear distance directly from the end point of each wire segment 40a-c and 42a-c (from points 90 and 90a, through the apex 92) is longer than the distance directly between each end point 90 and 90a, (see FIG. 3a) to the other end point. This construction permits the legs 40a-c and 42a-c to be extended or straightened to more easily fit or position each of the support members 60 and 160 into or about an opening in the armature and is an easy way to compensate for tolerance differences between the various parts of the systems.

Figure 6:
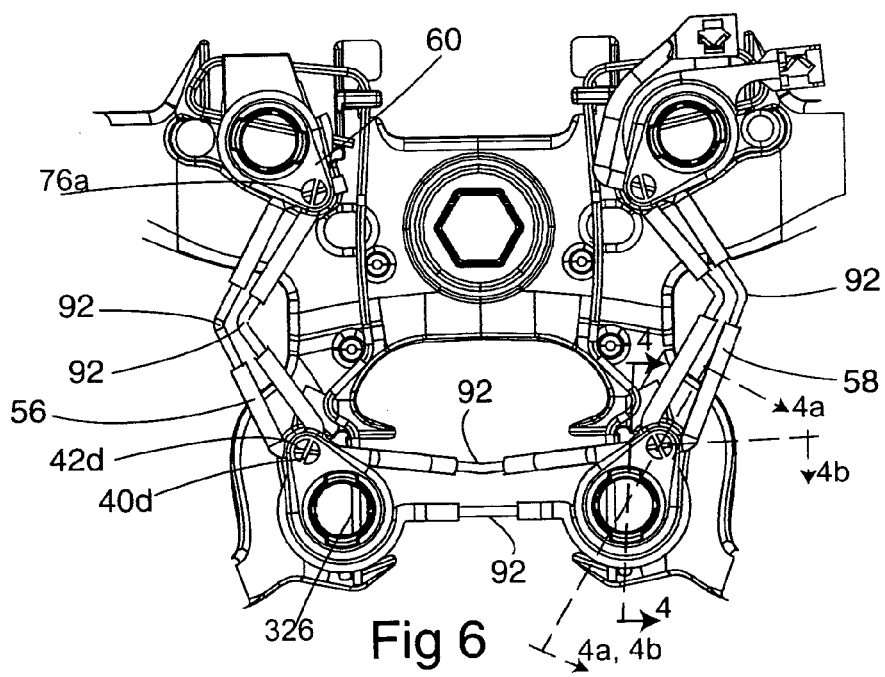
FIG. 6 shows the horn switch with portions of insulative material removed.

The thickness of the protective coatings 56 and 58 may be any desired thickness of about 1-2 mm and, as can be appreciated, as the thickness increases, the stiffness of the legs 56-58 of the horn switch increases, which may make it more difficult to seat the horn switch 16 to the armature 300 if the tolerances of the switch and armature are not controlled. Reference is briefly made to FIG. 6, which shows an alternate embodiment of the invention. In this embodiment, the plastic coating or sheathing 56, 58 in the vicinity of some or all of the inflection points is formed with a void or space exposing the conductive wire 40 and/or 42. With some of the sheathing removed, the legs of the horn switch become easier to extend, bend or straighten, facilitating placement of lower horn switch support members 160 in a respective opening 322 in the armature and making it easier to align the upper support members 60 to the lower support members 160. As can be appreciated, the sheathing can be removed from other locations of the legs, which also facilitates extension of the legs.

In FIG. 3c the plastic portions forming the upper housing 50 have been eliminated to better show how the exposed portions of wires 40 and 42 cross over each other. The contact portion 40d of wire 40 of the first or upper switch housing 50 will generally contact the contact portion 42d of wire 42 of the second or lower housing 40 at an angle, due to the shape of the first housing 50 and second housing 52. In particular, the exposed wire segment 40d, which extends through housing 50 and spans the first formed opening 76a, is generally offset an angle between 45 and 135 degrees with respect to the wire 42d, which passes through housing 52 and which spans opening 176a of the second housing 52.

Figure 7:
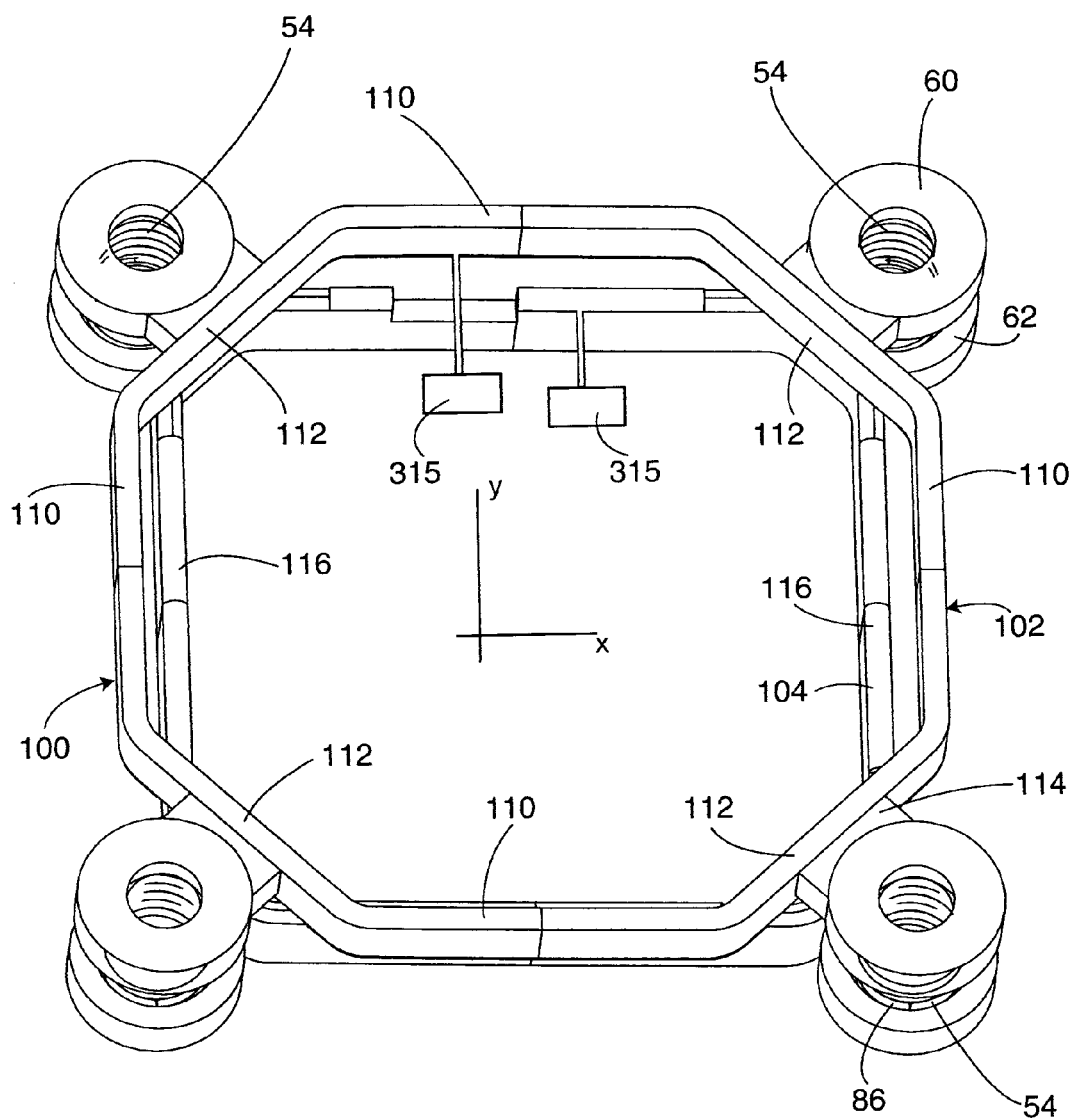
FIG. 7 is a perspective view of the horn switch according to an alternative embodiment of the present invention.
Figure 7A:
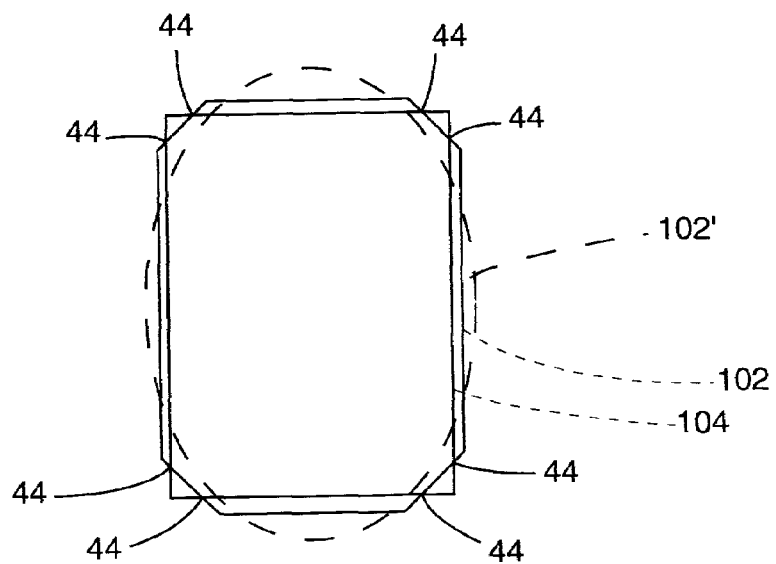
FIG. 7a illustrates only the conductive elements such as wires used in FIG. 7 and also shows an alternate embodiment.
Figure 8:
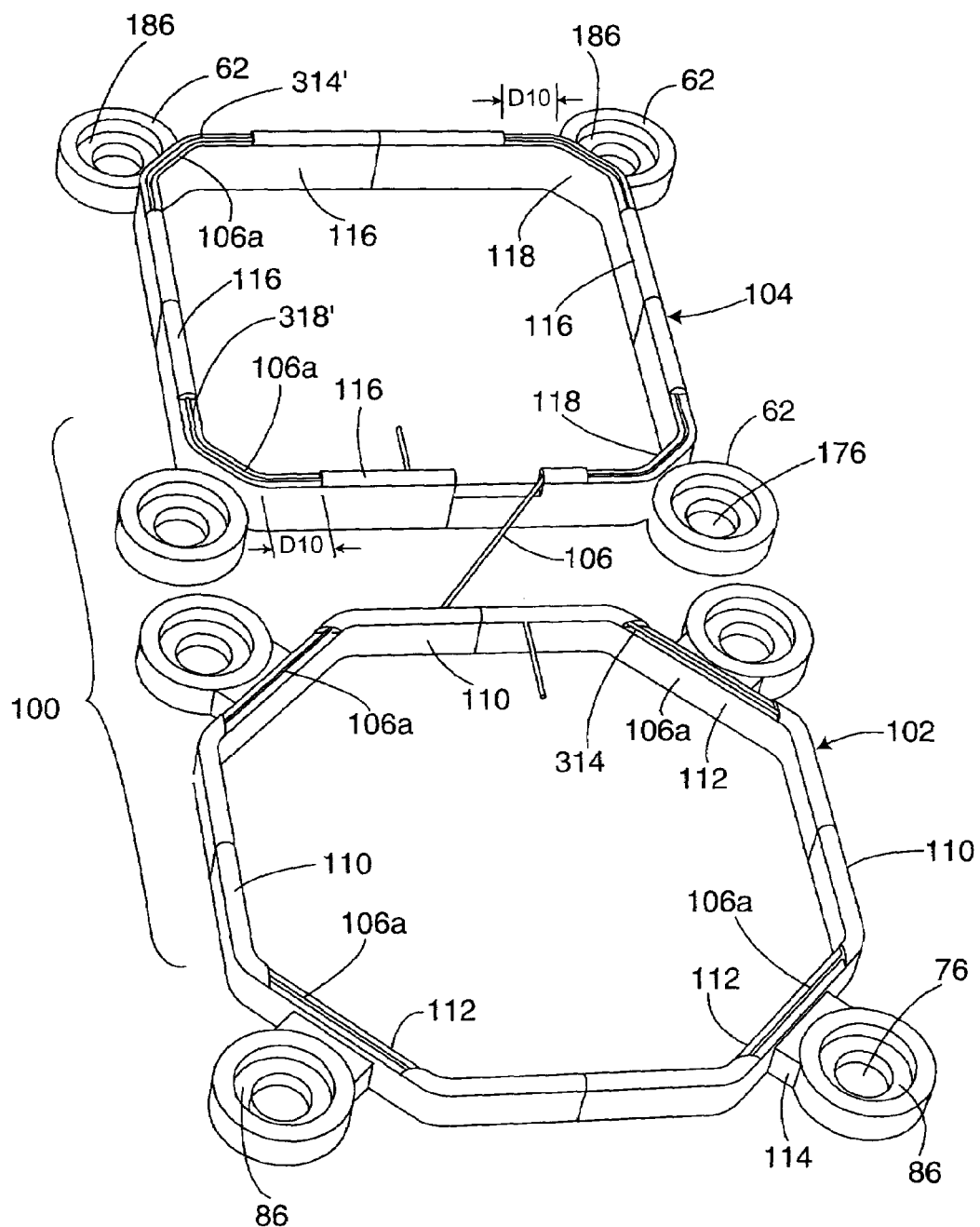
FIG. 8 is a perspective view of the horn switch of FIG. 7 prior to assembly.

As an alternative, a horn switch 100 (shown in FIGS. 7 and 8) can be formed with an octagonal shaped first or upper housing 102 and a rectangular second lower housing 104, as shown in FIGS. 7 and 8. In this alternative embodiment, the first housing 102 and second housing 104 may be molded in a family mold with a pair of conductive elements, or wires 106, positioned near the center of a mold (not shown). The first housing 102 and second housing 104 may be comprised of any suitable electrically insulative material. In order to eject the first housing 102 and second housing 104 from the mold, the wires 106 are each severed to provide four areas in which the wires 106 are exposed. In addition, the plurality of support members 60 and 62, each with respective alignable openings 76 and 176, may be molded into the first and second housing 102, 104 to couple the horn switch 100 to the air bag module 14 and wheel 18, as will be discussed in greater detail below. The shape of the wire(s) 106 in each of the upper and lower spring housings 102 and 104 yields eight contact points 44, as illustrated in FIG. 7a, compared with four electrical contacts or contact points shown in the earlier embodiment. Further, an elliptically shaped housing 102' (shown only in phantom line) is also shown in FIG. 7a, which crosses housing 104 eight times to illustrate that various wire shapes and variously shaped housing parts can be used to achieve this larger plurality of electrical contacts.

As mentioned, the upper housing 102 is generally octagonal in shape, and more specifically may be an irregular octagon having alternate sides 110, which are parallel along both an x-axis and y-axis. A second set of sides 112 is skewed forty-five degrees with respect to the x-axis and y-axis. The exposed wire segments 106a generally extend the length of the second set of sides 112. In addition, each of the second set of sides 112 supports one of the support members 60. The openings 76 are generally displaced from the sides 112 via a projection 114. The projection 114 is sized to enable the openings 76 of the first housing 102 and openings 176 of the second housing 104 to align.

Figure 9:
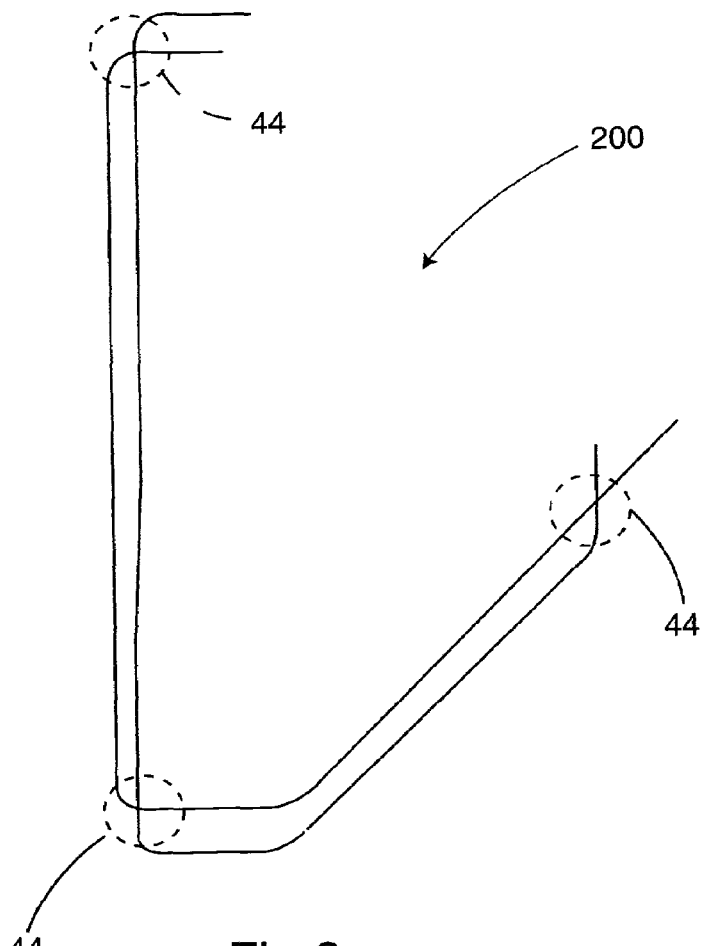
FIG. 9 is a perspective view of the horn switch according to a second alternative embodiment of the present invention.

The lower or second housing 104 is generally rectangular, having sides 116 and a plurality of chamfered corners 118. The exposed wire segments 106 extend along the corners 118 and may also extend a distance D10 along the slides 116. The corners 118 are further coupled to the support members 62 located on the corners 118 at such a location as to enable the openings 176 of the second housing 104 to align with the openings 76 of the first housing 102. In a second alternative embodiment, the horn switch 100 may be formed of a first housing and a second housing, which define three contact points as shown in FIG. 9. These contact points are preferably disposed radially about the center of the air bag module as shown.

In order to activate the horn switch 16, 100, 200, a driver of the vehicle may apply a force to an upper part, such as cover 20 of the air bag module 14, positioned adjacent the upper switch housing 50, 102. The force may be applied to any point on the cover 20 to activate the horn switch 16, 100, 200. More specifically, the cover 20 acts to distribute the force, which ensures that the application of the force to any location will activate the horn switch 16, 100, 200. The force, wherever applied to the cover 20, causes the springs 54 in the support members 60, 160 to compress. As the springs 54 compress, the exposed wire segments 40d (and 106a) of the first upper switch housing 52, 102 will contact the wires 42d (and 106a) of the second or lower housing 50, 104.

With respect to horn switch 100, the horn switch 100 is activated by a surface 314 of the wire 106a of the first housing 102 contacting a surface 314' of the wire 106 of the second housing 104. More specifically, the relative movement of the surface 314 against the surface 314' will cause the transmission of an electrical charge through an electrical connector 315 coupled to each of the wires 106 to the electrical circuit, and hence enable electrical energy to flow to the horn 27. Further, the relative motion of the surface 314 of the wire 106 against the surface 314' will work as a wiping action to keep the wires 106 free of debris or other particles that may enter the horn switch 100. Due to the shape of the first housing 102 and second housing 104, the surface 314 of the wire 106 of the first housing may generally contact the surface 314' of the wire 106 of the second housing 104 at an angle or parallel to the surface 314' of the wire 106 of the second housing 104.

In addition, as the horn switch 16, 100 contains a plurality of areas in which the wires 40, 42, and 106 are exposed, the multiple areas of exposed wire ensure that the horn switch 16, 100 may be activated due to the application of the force at various locations on the cover 20 of the air bag module 14. Further, the horn switch 16, 100, 200 of the present invention reduces manufacturing complexity by enabling the horn switch 16, 100, 200 to be formed in any suitable molding process, and also reduces the cost of the horn switch 16, 100, 200.

Figure 10:
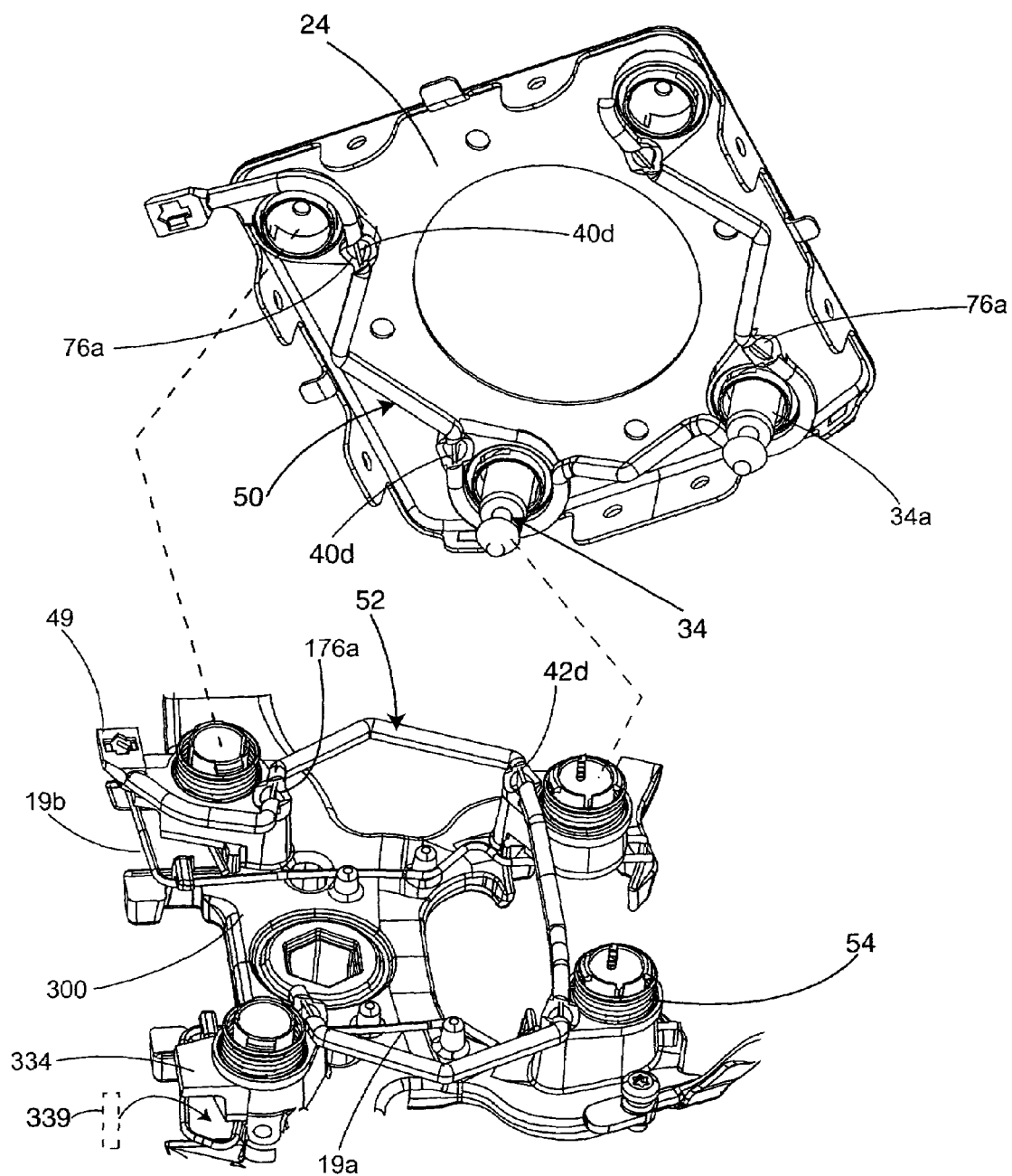
FIG. 10 shows another alternate embodiment of the invention.

Reference is briefly made to FIG. 10. In this embodiment, the horn switch 16 is separated with the upper horn switch housing 50 secured to the plate 24 (or in general to a movable element used to actuate the horn switch). The lower horn switch housing 52 is secured to the armature 300; the springs 54 are mounted to the lower horn switch housing 52. Upon assembly of the air bag module to the armature, the horn switch 16 is realized. The upper section of FIG. 10 shows, by way of illustration, that the plate 24 could include pins 34 to couple the movable element 24 to the stationary element. Two such pins are shown extending through upper support members 60. Alternatively, the movable element 24 need not include any pins.

The description of the invention is merely exemplary in nature and, thus, variations that do not depart from the gist of the invention are intended to be within the scope of the inven-

What is claimed is:

1. An assembly comprising:
a horn switch assembly (16) comprising a first (40) and second (42) conductive member movable from a disengaged position to an engaged position, each of the first and second conductive members having a like plurality of electrical contact locations;
wherein the horn switch assembly includes a first or upper horn switch part molded about the first conductive member except for predetermined locations which form a first set of electrical contacts, and a second or lower horn switch part molded about the second conductive member except for predetermined locations which form a second set of electrical contacts, the first and second set of electrical contacts configured such that when the conductive members are in the engaged position one or more of the contacts of the first and second set of electrical contacts are in engagement.

2. The assembly according to claim 1 wherein the first and second conductive members are one of extruded into wire forms or stamped.

3. The assembly according to claim 1 wherein the first and second conductive members are one of U-shaped or C-shaped.

4. The assembly according to claim 1 wherein the first conductive member is rectangular and the second conductive member is one of oval or octagonal.

5. The assembly according to claim 1 wherein the first and second conductive members are one of planar in shape or non-planar.

6. The assembly according to claim 1 wherein the first or upper horn switch part includes a set of first support members (60), each first support member located at a determinable portion of the first conductive member, each first support member includes a central cylindrical opening (76) therethrough and wherein the second horn switch part including a set of second support members (160), each first support member located at a determinable portion of the second conductive member, each second support member (160) including a cylinder with central cylindrical opening (176), each cylinder reciprocatively received in the opening (76) of a first support member.

7. The assembly according to claim 6 including at least one bias spring (54) urging the first and second horn switch housings apart.

8. The assembly according to claim 7 wherein the first and second horn switch housings are configured with a stop to limit separation of the housings.

9. The assembly according to claim 6 including a fixed support element (300) located below the horn switch and a movable element (20) for urging the upper horn switch housing toward the lower horn switch housing switch thereby closing at least one contact.

10. The assembly according to claim 9 wherein the movable element includes at least one locating pin (34, 37) received through the openings in the upper and lower horn switch housings (50, 52), the at least one pin extending to the fixed support element (300).

11. The assembly according to claim 10 wherein the fixed support element is an armature (300) of a steering wheel and wherein the movable element is an air bag module (14).

12. The assembly according to claim 1 wherein the upper horn switch housing (50) includes at least two first support members spaced apart wherein a portion of the first conductive member extends between the at least two first support members.

13. The assembly according to claim 12 wherein the at least two first support members are separated by a first distance and wherein a length, measured along said portion of the first conductive member, is longer than a first nominal distance.

14. The assembly according to claim 13 wherein the portion of the first conductive member is covered by an electrically insulative material.

15. The assembly according to claim 14 wherein the portion of the first conductive member includes an apex.

16. The assembly according to claim 15 wherein at least one portion of the first conductive member is not covered by an insulative member.

17. The assembly according to claim 15 wherein the uncovered portion of the at least one portion of the first conductive member is at or about the apex.

18. The assembly according to claim 1 wherein each of the first and second horn switch part is not electrically conductive.

19. The assembly according to claim 1 further including a steering wheel and an air bag module, wherein the first conductive member is configured to be mounted to the steering wheel or to the air bag module.

20. The assembly according to claim 19 wherein the second conductive member is configured to be mounted to the other of the steering wheel or air bag module, wherein the horn switch assembly is configured to become operational upon the mounting of the air bag module to the steering wheel thereby placing the first and second conductive members in an operative relationship.

21. An assembly for steering a vehicle comprising:
a driver interface operable to enable a driver to steer the vehicle;
at least one control member operable to couple the driver interface to the vehicle;
an air bag module coupled to the driver interface and operable to expand to absorb kinetic energy of the driver;
a horn switch coupled to the driver interface and the air bag module, the horn switch operable to generate an electrical signal based on an input from the driver, the horn switch further comprising:
a pair of electrically conductive wires operable to generate the signal, a first wire being bent in at least three locations corresponding to three electrical contact locations, the wire and any bend in the first wire generally being in the same plane;
the second wire having at least one bend therein, the second wire spaced from the first wire and movable into electrical contact therewith; wherein the first bend of the second wire is an overlaying relation with one of the bends of the first wire and brought into contact therewith on relative movement of the wires: the second wire including other portions movable into electrical contact with the other bent portions of the first wire.

22. An air bag module comprising:
an air bag operable to expand and including a first side and a second side;
a mounting plate coupled to the second side of the air bag;
a cover coupled to the mounting plate in order to be disposed over the first side of the air bag;
an inflator coupled to the mounting plate and operable to enable the air bag to expand;
a horn switch assembly coupled to the mounting plate, the horn switch assembly including:

a first wire having at least three bent portions along its length, each bent portion corresponding to a different electrical contact;

a second wire bent at one portion and having at least two other portions, wherein the bent portion and the two other portions correspond to different electrical contact; the second wire disposed a distance from the first wire; and wherein the bent portion of the second wire is configured to be brought into electrical contact with one of the bent portions of the first wire and wherein the other portions of the second wire are configured to be respectively brought into contact with the other bent portions of the first wire.

23. The assembly according to claim 22 wherein the first and second wires are planar in shape or non-planar in shape.

24. An assembly comprising:

a horn switch assembly (16) comprising a first (40) and second (42) conductive member movable from a disengaged position to an engaged position, each of the first and second conductive members having a like plurality of electric contact locations, wherein each conductive member includes at least three contact locations;

wherein the first and second conductive members are encased within a corresponding non-electrically conductive enclosure except near each contact location which remains exposed, wherein each enclosure includes a plurality of openings corresponding at least to the number of contact locations, wherein an exposed portion of a first or second conductive member spans a corresponding opening.

25. The assembly according to claim 24 including a support member in each opening of the enclosure to support the exposed portion of the first or second conductive member.

26. The assembly according to claim 24 including one or more springs situated between the first and second conductive members to bias the first and second conductive members apart.

27. The assembly according to claim 26 wherein the springs are located in proximity to the non-electrically conductive enclosures.

28. An assembly comprising:

a horn switch configured to couple a steering wheel with an air bag module, the horn switch operable to generate a signal when the horn switch is activated, the horn switch further comprising:

a pair of electrically conductive wires, including a bent first wire and a bent second wire, operable to generate a conductive path for the signal, a continuous first wire having at least three bent portions along its length, each bent portion corresponding to a different electrical contact;

a continuous second wire bent at one portion and having at least two other portions, wherein the bent portion and the two other portions correspond to different electrical contact; the second wire disposed a distance from the first wire; each of the first and second wires initially maintained in parallel planes; and wherein the bent portion of the second wire is configured to be brought into electrical contact with one of the bent portions of the first wire and wherein the other portions of the second wire are configured to be respectively brought into contact with the other bent portions of the first wire wherein a signal is generated when an exposed portion of the first wire contacts an exposed portion of the second wire.

29. The assembly according to claim 28 wherein the first and second wires are each substantially coated along their respective lengths with electrical insulators, the first wire not coated proximate each bent portion and the second wire not coated proximate its bend or other portions.

* * * * *